(12) United States Patent
Hiraro (10) Patent No.: US 11,839,823 B2
(45) Date of Patent: Dec. 12, 2023

(54) FREE-IN / FREE-OUT STYLE GAME PROGRAM

(71) Applicant: SQUARE ENIX CO., LTD., Tokyo (JP)

(72) Inventor: Takashi Hiraro, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 50 days.

(21) Appl. No.: 17/546,444

(22) Filed: Dec. 9, 2021

(65) Prior Publication Data

US 2022/0184508 A1 Jun. 16, 2022

(30) Foreign Application Priority Data

Dec. 10, 2020 (JP) ................. 2020-205266

(51) Int. Cl.
| | | |
|---|---|---|
| A63F 13/00 | (2014.01) | |
| A63F 13/837 | (2014.01) | |
| A63F 13/58 | (2014.01) | |

(52) U.S. Cl.
CPC ............ *A63F 13/837* (2014.09); *A63F 13/58* (2014.09); *A63F 2300/638* (2013.01)

(58) Field of Classification Search
CPC ........ A63F 13/45; A63F 13/822; A63F 13/79; A63F 13/69; A63F 13/00; A63F 13/55
See application file for complete search history.

(56) References Cited

U.S. PATENT DOCUMENTS 6,273,814 B1 * 8/2001 Komoto ................ A63F 13/833
463/43

OTHER PUBLICATIONS

Clash of Clans—https://youtu.be/jYWJt9LPXfc (Year: 2020).*
Star Wars: Battlefront—https://youtu.be/kjcL_WxALpo (Year: 2016).*

* cited by examiner

*Primary Examiner* — David L Lewis
*Assistant Examiner* — Eric M Thomas
(74) *Attorney, Agent, or Firm* — Greenblum & Bernstein, P.L.C.

(57) ABSTRACT

A game program instructions executable by a processor to perform operations comprising: placing a predetermined number of nonplayer characters in a battle space; controlling the battle between the nonplayer character and the playing character in the battle space; rendering the battle state with a virtual camera and displaying on the display; the operations further comprising: counting the number of playing characters placed in the battle space; excluding a defeated nonplayer character from battle when the nonplayer character is defeated; relocating the excluded nonplayer character to the battle space after a predetermined respawn time elapsed; calculating the respawn time according to the counted number of playing characters and controlling the time to reposition the excluded nonplayer character to the battle space based on the respawn time calculated.

15 Claims, 13 Drawing Sheets

FREE-IN / FREE-OUT STYLE GAME PROGRAM

CROSS REFERENCE TO RELATED APPLICATION

The present disclosure relates to subject matter contained in Japanese patent application No. 2020-205266 filed on Dec. 10, 2020, the disclosure of which is expressly incorporated herein by reference in its entirety.

BACKGROUND

The present invention relates to a game program that allows a playing character to be placed/withdrawn (free-in/free-out) at any time in a battle space set in a three-dimensional virtual space. In particular, the present invention relates to the game program that controls the revival time of the enemy nonplayer character according to the number of playing characters placed in the battle space.

A game program that can freely place/withdraw (free-in/free-out) the playing character operated by the player at any time in the battle space according to the command from the player via a number of terminals connected to the server for the battle space set in the three-dimensional virtual space of the server's memory is known.

In these game programs, the playing characters operated by the player are free to place/withdraw (i.e., enter and exit) to the battle space at any given time. Therefore, in order to ensure a smooth continuation of the battle, the nonplayer character (characters whose behavior is controlled by game programs) as the enemy character placed in the battle space where the battle takes place is controlled to revive to the battle space after a certain time defeated by the playing character operated by the player, so that the battle can continue smoothly in the battle space (i.e. to keep enemy characters in the battle space at all times) where it is always estimated that a certain number of playing characters are participating in the battle.

However, in such control, regardless of the number of playing characters placed in the battle space and operated by the player participating in the battle, the enemy character (nonplayer character) defeated by the playing character is resurrected after a certain time and is controlled to participate in the battle again.

In that case, if there is only one playing character placed in the battle space, that is, if there is only one player who is placing his playing character in the battle space at that time, there will be many enemy characters to be defeated, and no matter how much the enemy character is defeated, the situation where the war situation does not turn around due to the enemy character that revives after a certain time continues, difficulty may increase significantly. This can cause players who manipulate playing characters to feel a lot of stress and lose interest in the game.

On the other hand, if there are multiple playing characters placed in the battle space, that is, if there are multiple players placing their playing characters in the battle space at that time, the higher the number, the lower the number of enemy characters to be defeated per person. So soon after the enemy character is resurrected, all will be killed in a short period of time, greatly reducing the difficulty of the battle. Even in these cases, there is a high risk of losing the fun of the game.

The object of the present invention is to control the time from the time the enemy character is defeated by the battle to the time to revival according to the number of playing characters pieced in the battle space, and to prevent a significant change in difficulty even if the number of playing characters in the battle space changes, and to provide a game program that can maintain a good game balance.

SUMMARY

The first aspect of the present invention is that a non-transitory computer-readable storage medium storing computer game program instructions executable by a processor (2) to perform operations comprising:
  placing a predetermined number of nonplayer characters (NPC) in a battle space (BF) set in a three-dimensional virtual space;
  in response to an instruction from one or more players, controlling the playing character (PC) corresponding to the player to be placed and to be withdrawn in and from the battle space (BF) at any time;
  performing a procedure for controlling the battle between the nonplayer character (NPC) and the playing character (PC) disposed in the battle space (BF);
  rendering the battle state between the nonplayer character (NPC) and the playing character (PC) in the battle space (BF) with a virtual camera arranged in the battle space, and displaying on the display of each player;
  the computer game program instructions further comprising:
  counting the number of playing characters (PC) placed in the battle space;
  excluding a defeated nonplayer character (NPC) from battle when the nonplayer character (NPC) is defeated by the playing character (PC) in the battle space (BF);
  relocating the excluded nonplayer character (NPC) to the battle space (BF) after a predetermined respawn time (RT) elapsed; and
  calculating the respawn time (RT) according to the counted number of playing characters (PC) that are placed in the battle space;
  wherein the relocating further comprising controlling the time to reposition the excluded nonplayer character (NPC) to the battle space based on the respawn time (RT) calculated.

The second aspect of the present invention is that the calculating the respawn time further including that the more the number (m) of playing characters (PC) placed in the battle space (BF), the shorter the respawn time (RT) is calculated.

The third aspect of the present invention is that the minimum value is set for the respawn time (RT) and when the number (m) of playing characters (PC) placed in the battle space is more than a predetermined number, the respawn time is set to the minimum value.

The fourth aspect of the present invention is that the respawn time (RT) has a default respawn time (DT) set, and when there is only one playing character (PC) placed in the battle space (BF), the default respawn time (DT) is set as the respawn time (RT).

The fifth aspect of the present invention is that a game system comprising a processor and a memory storing computer game program instructions executable by the processor to perform operations comprising:
  placing a predetermined number of nonplayer characters in a battle space (BF) set in a three-dimensional virtual space;

in response to an instruction from one or more players, controlling the playing character corresponding to the player to be placed and to be withdrawn in and from the battle space at any time;

performing a procedure for controlling the battle between the nonplayer character and the playing character disposed in the battle space;

rendering the battle state between the nonplayer character and the playing character in the battle space with a virtual camera arranged in the battle space, and displaying on the display of each player;

the computer game program instructions further comprising:

counting the number of playing characters placed in the battle space;

excluding a defeated nonplayer character from battle when the nonplayer character is defeated by the playing character in the battle space;

relocating the excluded nonplayer character to the battle space after a predetermined respawn time elapsed; and calculating the respawn time according to the counted number of playing characters that are placed in the battle space;

wherein the relocating comprising controlling the time to reposition the excluded nonplayer character to the battle space based on the respawn time calculated.

According to the present invention, the respawn time (RT) of the nonplayer character (NPC) defeated by the playing character (PC) is changed by the number of playing characters (PC) placed in the battle space (BF). So, when the playing character (PC) is one person in the battle space (BF) and when the playing character (PC) is a plurality in the battle space BF, the respawn time (RT) from the time the nonplayer character (NPC) is defeated to the time the nonplayer character (NPC) is relocated can be changed for each case.

Also, if the respawn time (RT) is controlled to be shorter as the number of playing characters (PC) placed in the battle space (BF) increase, the respawn time (RT) of nonplayer character (NPC) becomes to be shorter as the number of playing characters (PC) increase. As the difficulty of the game increases, even if the number of playing characters (PC) increases, the appropriate respawn time (RT) can be set.

Furthermore, as the respawn time has a minimum value, if the number of playing characters (PC) placed in the battle space (BF) is more than a certain number, the respawn time (RT) is set to the minimum value. When a certain number of or more playing characters (PC) participate in a battle, it becomes easy to defeat non-player characters (NPC) in a short time, and it is possible to attack with many playing characters (PC) and advance the battle situation advantageously, enabling realistic battle situations to be reproduced.

DETAILED DESCRIPTION

The following examples describe specific details for a deeper understanding, but the examples are not bound by these specific details. In addition, in order to avoid unnecessary and complicated descriptions, well-known matters do not be described the details.

Figure 1:
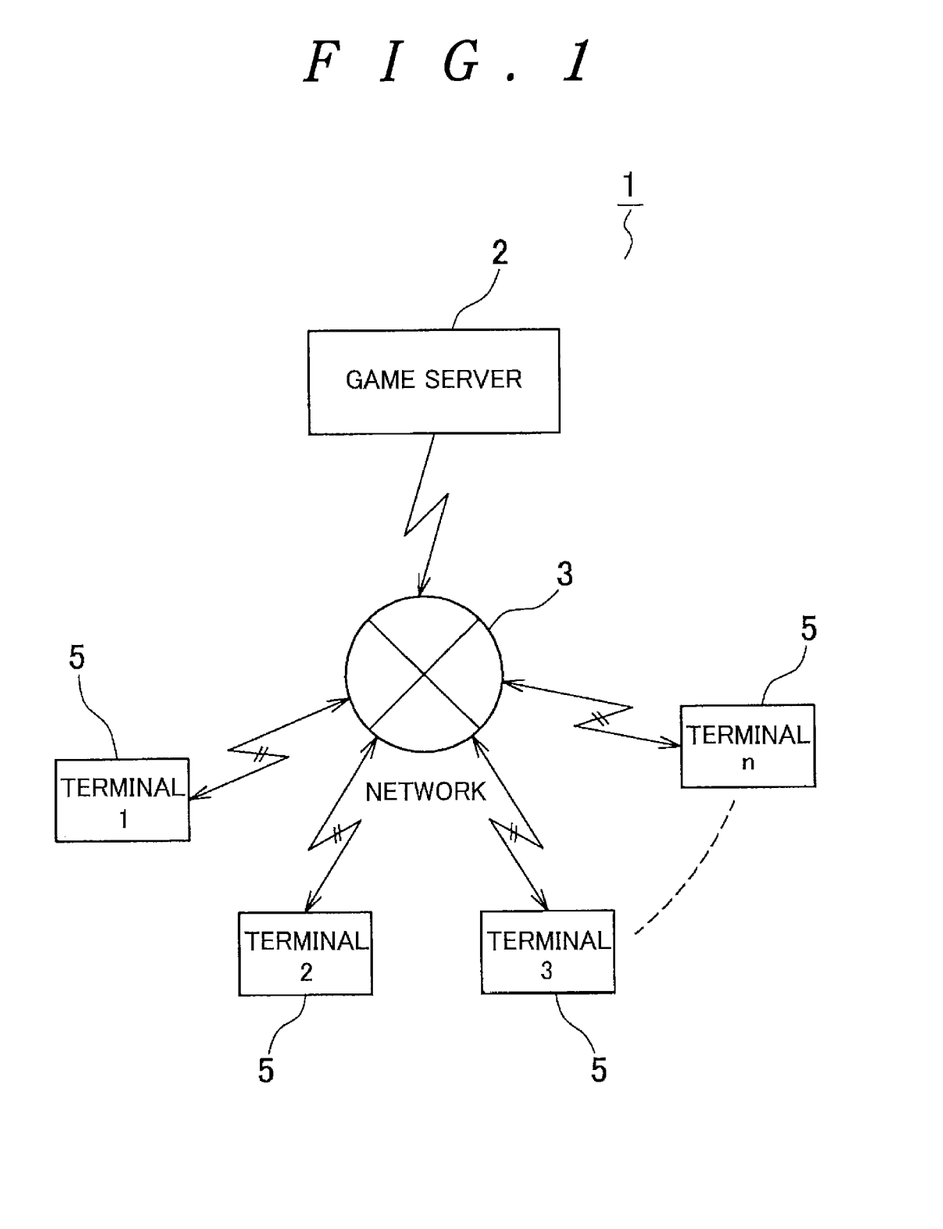
FIG. 1 is a block diagram showing an example of a game system to which the present invention applies.

The game system 1 to which the present invention applies has a game server 2 as shown in FIG. 1, and a large number of terminals 5 are connected to the game server 2 via a communication network 3 such as the Internet. Each terminal 5 is illustrated as "terminal 1", "terminal 2", "terminal 3", " . . . ", "terminal n", but when each terminal is not distinguished, it is simply referred to as the terminal 5. Further, in addition to a stationary terminal for game only, each terminal 5 may be configured as portable gaming terminal, portable general-purpose terminal such as smartphone and tablet, and personal computer, as long as the playing character of the player operating each terminal 5 can be controlled to be placed/be withdrawn to or from a battle space in a three-dimensional virtual space formed in the memory of the game server 2 by connecting to the game server 2.

Figure 2:
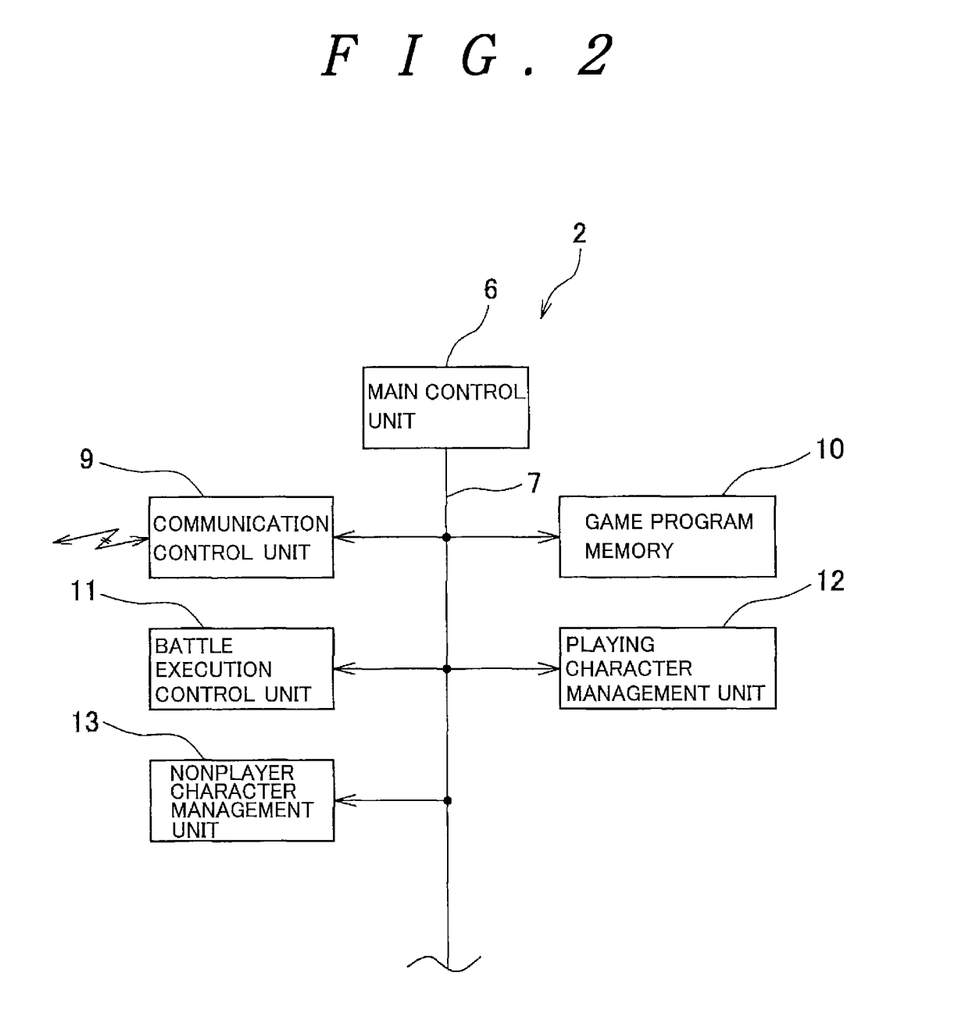
FIG. 2 is a block diagram showing an example of a game server.

As shown in FIG. 2, the game server 2 has a main control unit 6, and the main control unit 6 is connected to the communication control unit 9 connected to the network 3, game program memory 10, a battle execution control unit 11, a playing character management unit 12 and a nonplayer character management unit 13 via the bus line 7. The main control unit 6, the communication control unit 9, the game program memory 10, the battle execution control unit 11, the playing character management unit 12, and the nonplayer character management unit 13 which constitute the game server 2 shown in FIG. 2 are illustrated to facilitate the understanding of the present invention. In fact, it functions as a computer comprising of a CPU (central processing unit or processor), memory, various control programs, etc. In addition, by executing a part of the game program PRO described later, the game server 2 functions the CPU of the computer constituting the game server 2 as a function block of FIG. 2 constituting each game server 2 in a time-division manner. Naturally, each function block shown in FIG. 2 can be configured with a dedicated hardware and/or software.

Since the game system 1 has the above-described configuration, the game by the game system 1 is executed as follows. While multiple players operate each terminal 5 and log in to game server 2, each player moves and controls its playing character in a battle space in a three-dimensional virtual space formed in the memory of the battle execution control unit 11 of the game server 2, and fights with the nonplayer character as an enemy character similarly placed in the battle space.

Through such a large number of terminals 5, games in which a playing character corresponding to each player is battled with an enemy character in a battle space in a three-dimensional virtual space of the server 2 is well known. Thus, the playing character corresponding to each player is already stored in memory in the playing character management unit 12 of the server 2, with various battle capability data (data necessary for combat with enemy characters in the battle space, such as HP, MP, weapons, items, etc.) and the object data of each playing character, and the attribute data thereof, So it will also be described that the playing character corresponding to each player can freely act in the battle space according to instructions from each terminal 5 of the player via a game program stored in the game program memory 10. The same is true for non-player characters who perform battle actions with playing characters in battle spaces.

Usually, when the player performs a game with battle action in the battle space in the game server 2 based on the game program, each player operates his terminal 5 and logs in to the server 2 via network 3. The login information of each player is processed by the communication control unit 9, and the playing character management unit calls the data of the playing character of the logged in player from the memory not shown and outputs it to the battle execution control unit 11. In the battle execution control unit 11, based on the game program, the playing character of the logged in player (one or more) is disposed at a predetermined position in the battle space in the three-dimensional virtual space at a predetermined timing.

Figure 3:
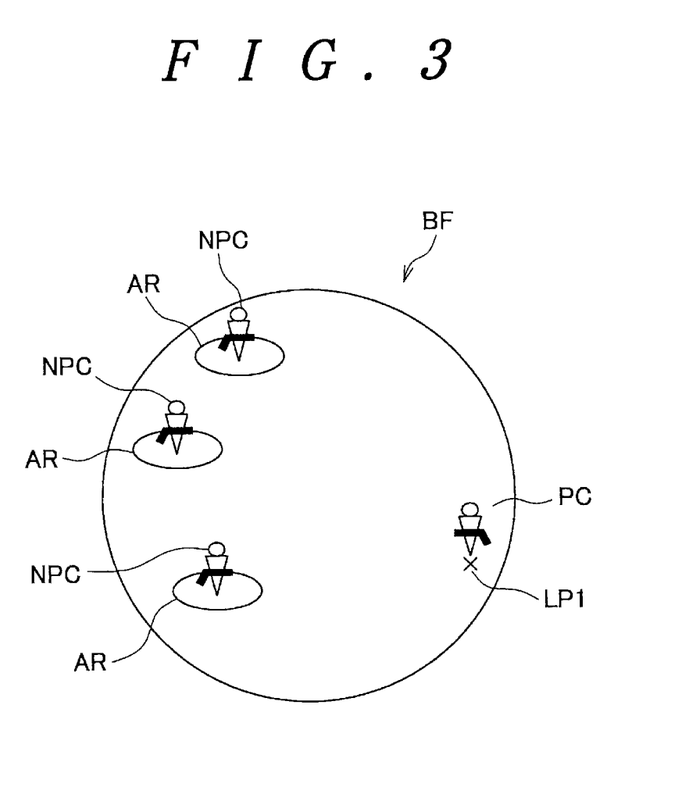
FIG. 3 shows a schematic diagram showing an example of control of the battle mode when the playing character is alone.
Figure 8:
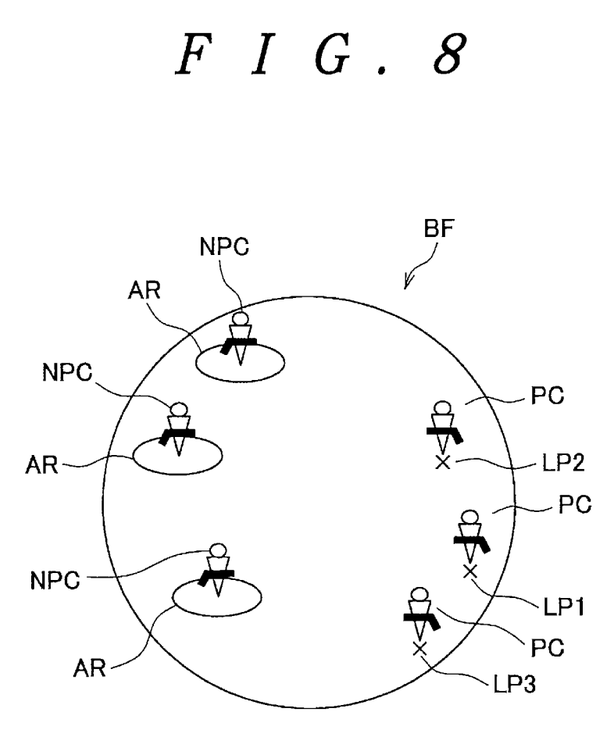
FIG. 8 shows a schematic diagram showing an example of control of the battle mode when the playing character is three people.

For example, as shown in FIGS. 3 and 8, the battle space BF in the three-dimensional virtual space set in the memory of the battle execution control unit 11 is set that its plane shape is a circle, and the playing character PC of the logged in player is placed on predetermined placement points LP1 to LP3 set in the battle space BF based on the game program (the placement points vary between LP1 to LPn (n: integer), depending on the number of playing character PC placed at the same time). The placement points LP1 to LPn of the playing character PC are appropriately determined by the battle execution control unit 11 based on the game program by how many playing characters of other players are simultaneously placed in the battle space BF at the time the playing character PC is placed in the battle space BF. That is, the placement points LP1 to LPn are set so that the playing characters are appropriately distributed in the battle space BF. Since such a method is known, the detailed explanation is omitted. The plane shape of the battle space BF set in the three-dimensional virtual space is not limited to a circle, but is optional.

Now, if there is only one playing character PC placed in the battle space BF, as shown in FIG. 3, the playing character PC is placed at the placement point LP1 at the right end of the figure in the battle space BF. And when there are three playing characters PC disposed in the battle space BF, as shown in FIG. 8, the playing characters PC are disposed in three places: placement points LP1 to PL3 on the right side of the figure in the battle space BF.

When a playing character PC is placed in the battle space BF, based on the game program, the battle execution control unit 11 reads out the nonplayer characters NPC that perform battle in the battle space BF based on the game program via the non-playing character management unit 13, and places the read out non-playing characters NPC as a plurality of enemy characters at positions opposite to the playing character PC in the battle space BF. In this embodiment, three non-player characters NPC are arranged, but the nonplayer characters NPC that are enemy characters are arranged at random positions in the appearance area AR (it is displayed as an ellipse in the figure, but it is not actually displayed as an image. It is a virtual setting in the battle execution control unit 11 based on the game program to the last) set in advance in the battle space BF by the game program.

When the nonplayer character NPC, which is the enemy character, is placed, a battle begins between the nonplayer character NPC, which is the enemy character, and the playing character PC. These battles are performed by a known method, and the fighting execution control unit 11 responds damage between the playing character PC and the nonplayer character NPC that is the enemy character based on the game program. The state of the battle is rendered by a virtual camera appropriately installed in the battle space BF, transmitted to the terminal 5 of each player via the communication control unit 9, and displayed on the display not shown in the terminal 5.

Figure 4:
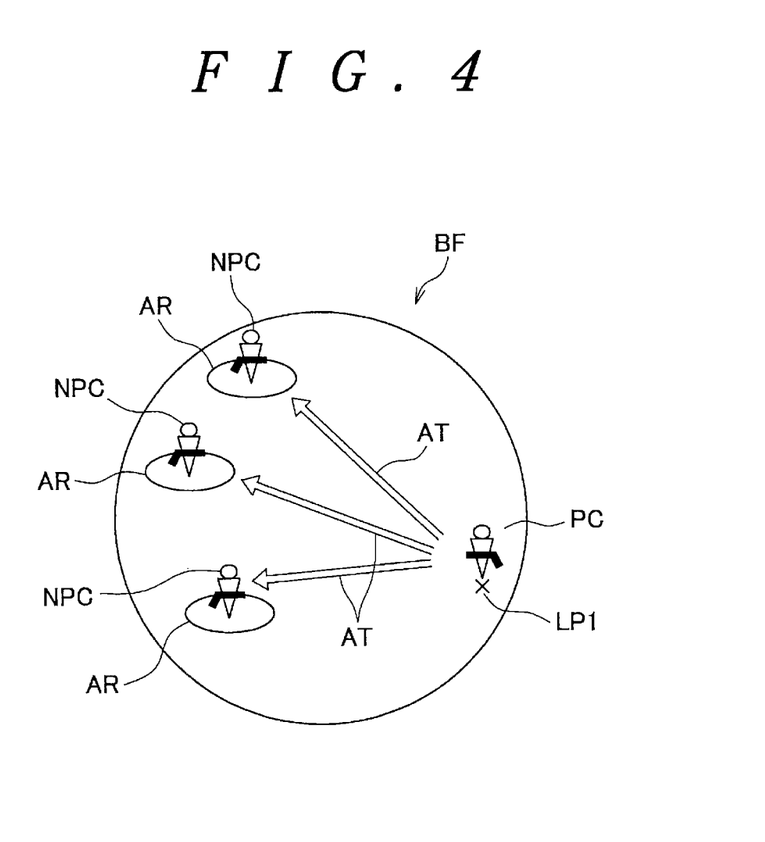
FIG. 4 shows a schematic diagram showing an example of control of the battle mode when the playing character is alone.
Figure 9:
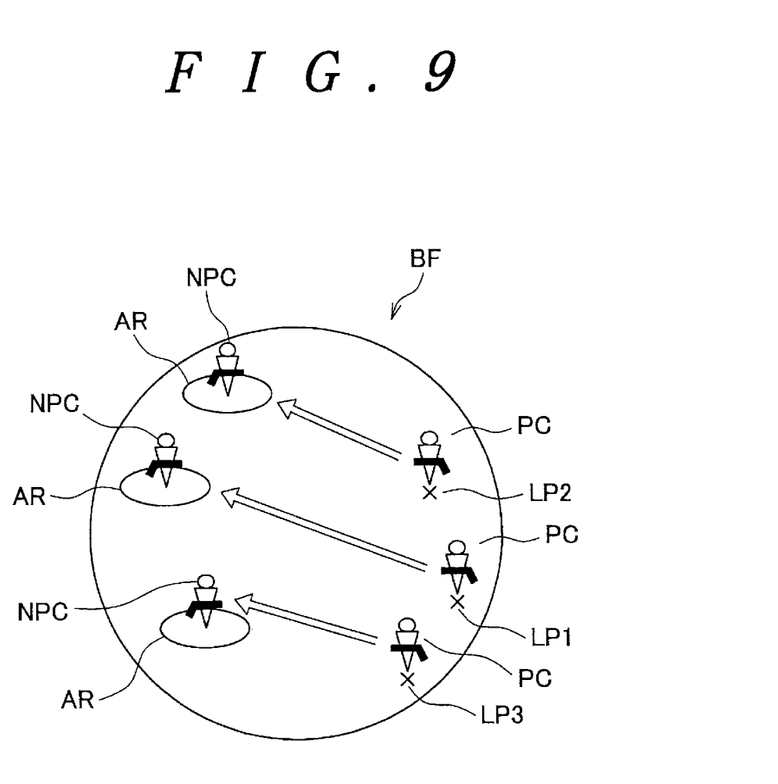
FIG. 9 shows a schematic diagram showing an example of control of the battle mode when the playing character is three people.

Thus, as shown in FIG. 4 or FIG. 9, a battle is performed between the playing character PC and the nonplayer character NPC. For example, it may occurs that a playing character PC attacks nonplayer characters NPC that are three enemy characters as shown in FIG. 4 and defeats each nonplayer character NPC as shown in FIG. 5 (the attack AT is schematically displayed with an arrow in the figure), or as shown in FIG. 9, three playing characters PC attack the nonplayer characters NPC that are the three enemy characters and defeats each nonplayer character NPC as shown in FIG. 10 (the attack AT is schematically displayed with arrows in the figure, but it does not mean that the nonplayer characters NPC which are enemy characters and the playing character PC fight in a one-to-one attack pattern).

Figure 5:
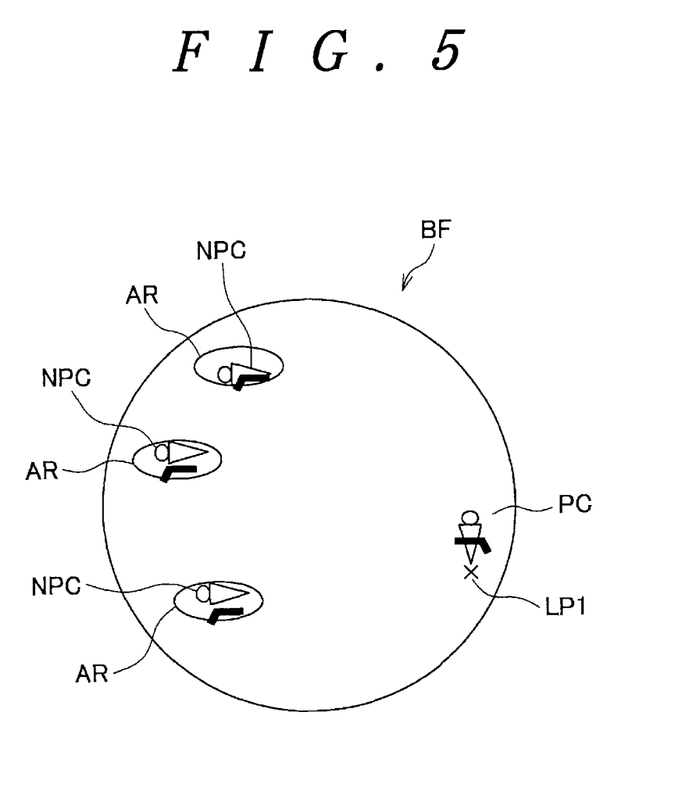
FIG. 5 shows a schematic diagram showing an example of control of the battle mode when the playing character is alone.
Figure 6:
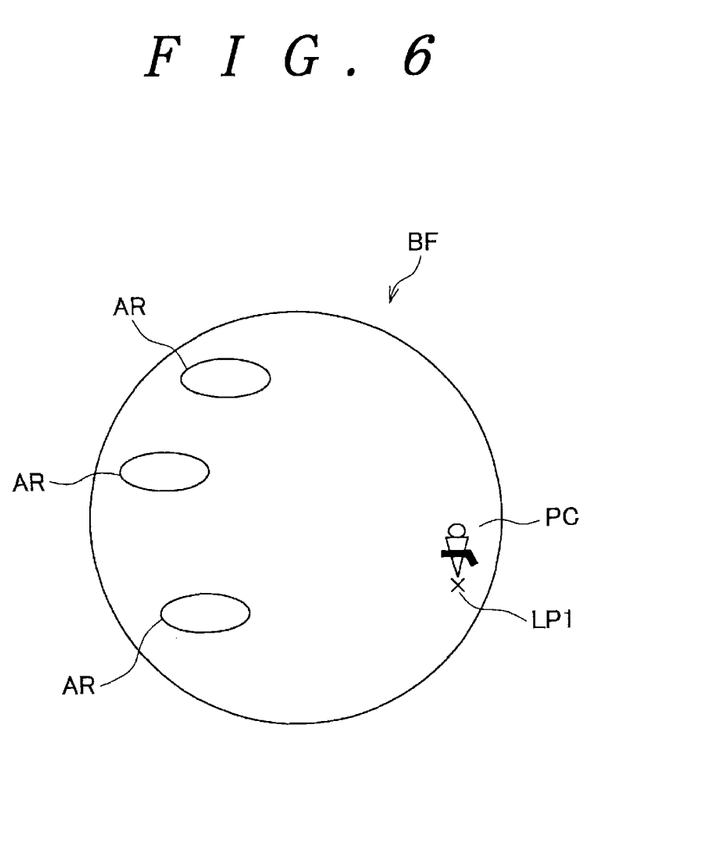
FIG. 6 shows a schematic diagram showing an example of control of the battle mode when the playing character is alone.
Figure 10:
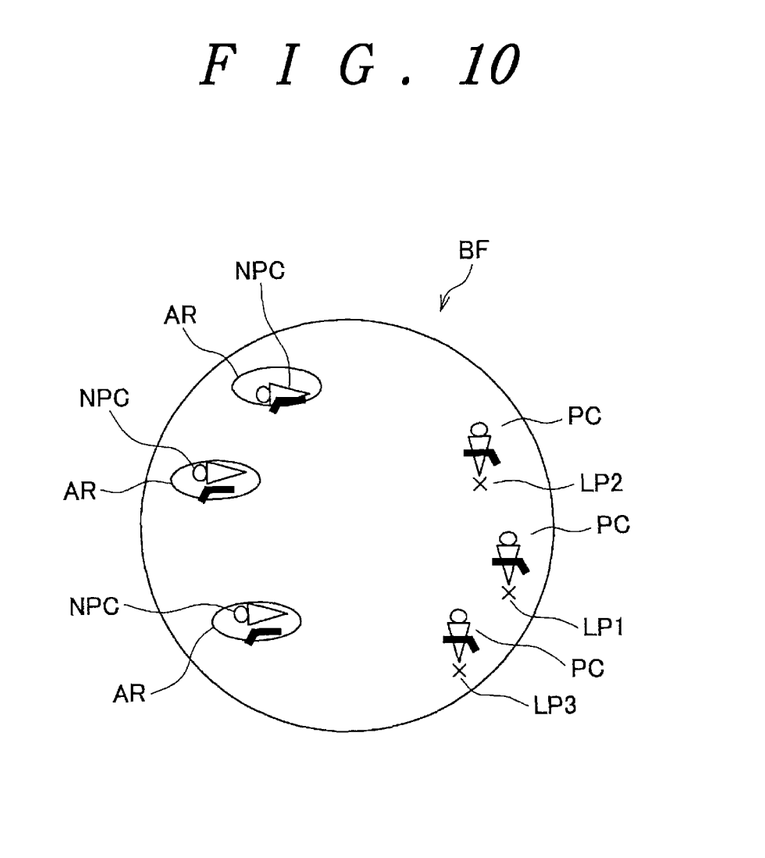
FIG. 10 shows a schematic diagram showing an example of control of the battle mode when the playing character is three people.
Figure 11:
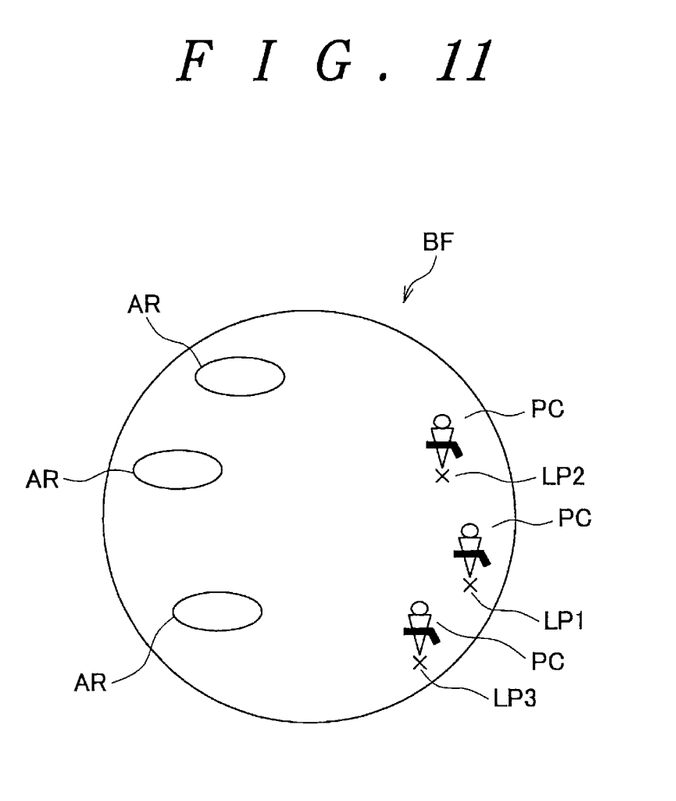
FIG. 11 shows a schematic diagram showing an example of control of the battle mode when the playing character is three people.

As shown in FIGS. 5 and 10, when the playing character PC defeats the nonplayer characters NPC which are the enemy character respectively (in FIGS. 5 and 6, all enemy characters are defeated, but when at least one enemy character is defeated), the object of the defeated nonplayer character NPC is excluded from the battle space BF, as shown in FIGS. 6 and 11. And the enemy character is erased from the video of the battle space BF captured (rendered) from the virtual camera, thus the enemy character is erased from the video on the display of the terminal 5 of each player, and is excluded from the battle. By this, the player recognizes that he has defeated the nonplayer character NPC, which is the enemy character.

On the other hand, in the battle execution control unit 11, when the nonplayer character NPC that is the enemy character is defeated by the playing character PC operated by the player, the respawn control program RCP, which is a part of the game program, is executed to control the respawn behavior of the defeated nonplayer character.

Figure 13:
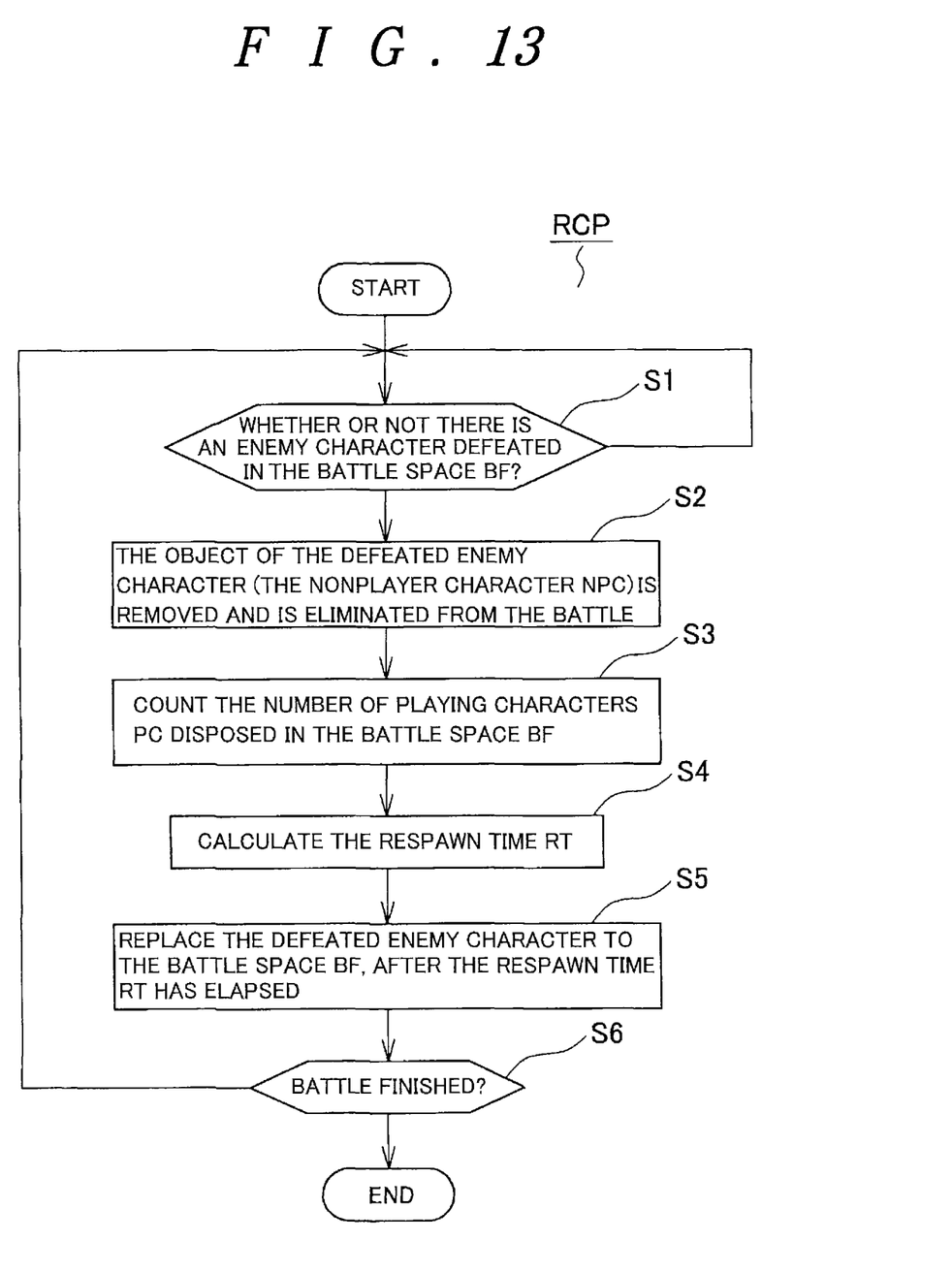
FIG. 13 is a flowchart showing an example of a respawn control program.

That is, as shown in FIG. 13, the battle execution control unit 11 always monitors whether or not there is an enemy character defeated in the battle space BF from the battle state between the nonplayer character NPC which is the enemy character and the playing character PC operated by the player in the battle space BF, in step S1 of the respawn control program RCP. When a defeated enemy character (nonplayer character NPC) is detected in the battle space BF, the respawn control program RCP enters step S2, and as described above, the object of the defeated enemy character is eliminated from the battle space BF. Next, it enters step S3 of the respawn control program RCP, and when the enemy character is defeated, the number of playing characters PC disposed in the battle space BF is counted. Since the number of playing characters PC in the battle space BF is equal to the number of players participating in the battle in the battle space BF, it can be easily obtained from the login state of each terminal 5. Since the battle execution control unit 11 controls based on the game program so that the player can place and withdraw the playing character PC to and from the battle space BF at any time through his terminal 5, the number of playing characters PC in the battle space BF is constantly changing. Therefore, the number of playing characters PC in the battle space BF is counted by the battle execution control unit 11 every certain time based on the game program, but the number of playing characters PC to be adopted in the respawn time calculation described later is desirable to adopt the number at the time the enemy character is defeated or at an appropriate time thereafter.

The number of playing characters PC currently placed in the battle space BF is one in the case of FIG. 5 and three in the case of FIG. 10. When the number of playing characters PC in the battle space BF is found, step S4 is entered and the respawn time RT of the defeated enemy character is calculated by equation (1). Here, respawn time RT means the time from the time the enemy character is killed to the time the enemy character is revived in the battle space BF again.

$$RT = DT - (10 \times (m-1)) \quad (1)$$

RT: respawn time (in seconds), DT: default respawn time (in seconds), m: number of playing characters in the battle space BF In the case of equation (1), the respawn time RT is set with a default respawn time DT based on the case of one playing character PC in the battle space BF. This default respawn time DT is, for example, 60 seconds, but can be appropriately set. Depending on equation (1), the respawn time RT decreases by 10 seconds from the default respawn time DT, as the number of playing characters PC in the battle space BF increases by one person. Therefore, in the case of FIG. 5, since the playing character PC is one, the respawn time RT is the default respawn time (e.g., 60 seconds), and in the case of FIG. 10, the playing character PC is three, so the respawn time RT is reduced by 20 seconds from the default respawn time (e.g., 60 seconds), for example, 40 seconds. The arithmetic expression for determining the respawn time RT can adopt various forms as long as the respawn time RT is varied according to the number of playing characters PC placed in the battle space BF. Note that the minimum value of the respawn time RT is set to, for example, 10 seconds, and when the number m of the playing character PC is more than a certain number, the respawn time RT is set to the minimum value.

Figure 7:
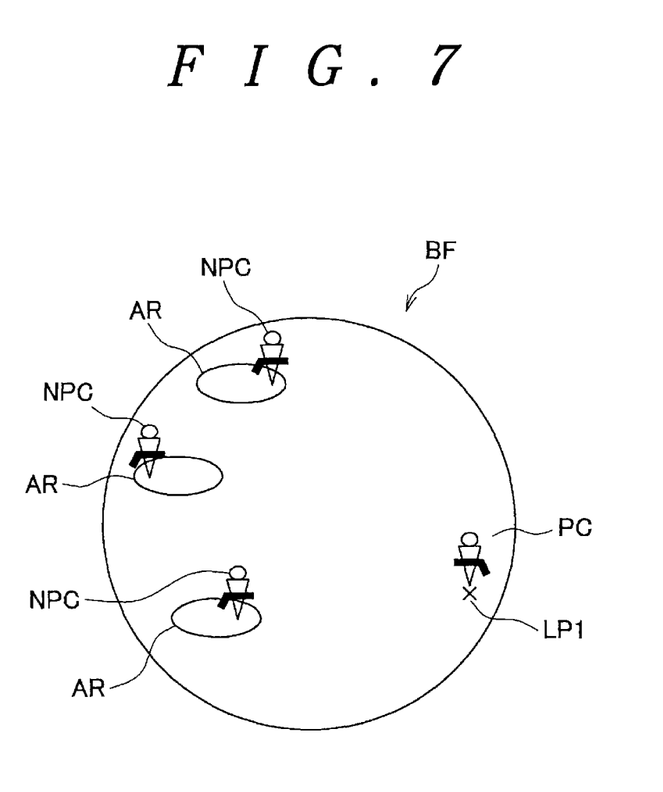
FIG. 7 shows a schematic diagram showing an example of control of the battle mode when the playing character is alone.
Figure 12:
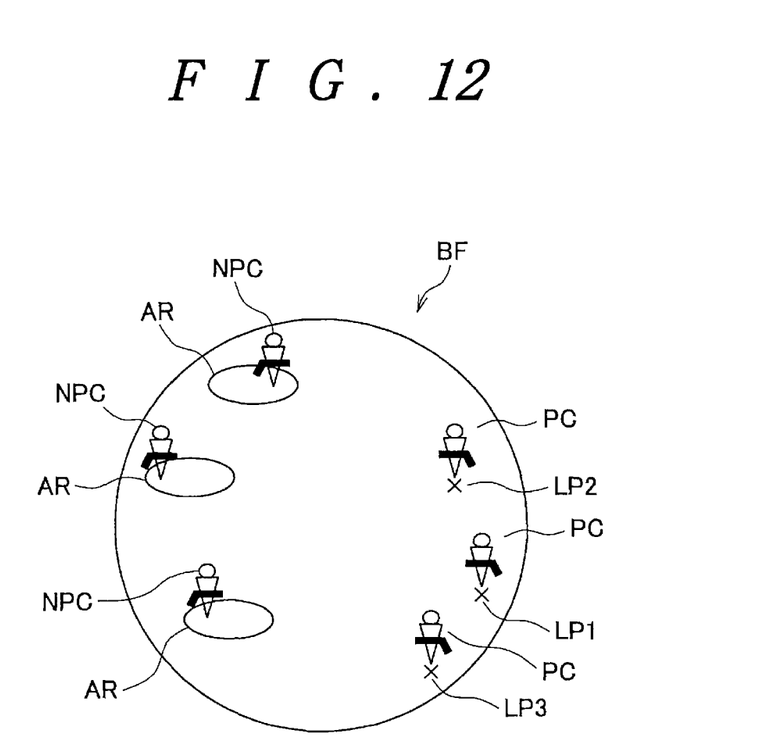
FIG. 12 shows a schematic diagram showing an example of control of the battle mode when the playing character is three people.

In addition, when a plurality of battle space BF is set (that is, there are multiple battle stages, and the playing character PC clears each battle stage sequentially, that is, sequentially captures multiple battle spaces BF to progress the game), the default respawn time DT is depending on the strength of the nonplayer character NPC which is enemy characters and the playing character PC, placed in the battle space BF, so the default respawn time DT may be set to fluctuate every battle stage (battle space BF).

Where the respawn time RT was obtained in step S4, the battle execution control unit 11 enters step S5 of the respawn control program RCP, and as shown in FIGS. 7 and 12, the nonplayer character NPC, which was once defeated, is replaced (respawn) to each corresponding spawn area AR and is returned to battle after the nonplayer character NPC was knocked down and the respawn time RT calculated in step S4 has elapsed, In this state, the nonplayer characters NPC, which are replaced enemy characters, and the playing characters PC in the combat space BF can start fighting again.

In addition, various aspects are considered in the return mode of the nonplayer character NPC which is the enemy character to the battle space BF at the time of respawn. Various effects can be used, for example, when the battle space BF is outdoors, such as a production in which the non-player character NPC descends to the appearance area AR with a parachute and returns, and when the battle space BF is indoors, a production that the non-player character NPC breaks the door and enters.

Thus, since the respawn time RT of the nonplayer character NPC, which is the enemy character defeated by the playing character PC, is changed by the number of playing characters PC arranged in the battle space BF, for example, as shown in FIGS. 3 to 7, in the case where the playing character PC is one people in the battle space BF, and as shown in FIGS. 8 to 12, in the case where the playing character PC is three people in the battle space BF, the respawn time RT from the nonplayer character NPC that is the enemy character is defeated until the enemy character is relocated can be changed.

Then, for example, when equation (1) is used, when DT is 60 seconds, when the playing character PC is one person in the battle space BF, the respawn time of the enemy character is 60 seconds, and when the playing character PC is three people in the battle space BF, the respawn time of the enemy character is reduced by 20 seconds to 40 seconds. As a result, when the playing character PC is one, the respawn time RT of the enemy character is longer than in the case of three people, and the battle can be performed with a margin, making it easier to achieve the clear conditions set by the game program. On the other hand, if the playing character PC is 3 people in the battle space BF, the force is more than that of one person, but the respawn time RT of the enemy character is shorter than that of one, so the number of enemy characters that each player should defeat can be set to be an appropriate difficulty level. Therefore, the case that soon after the enemy characters revive, all are knocked down in a short time, and the difficulty of the battle decreases greatly, is prevented.

Thus, the battle between the nonplayer character NPC, which is the enemy character, and the playing character PC operated by the player continues in a way that the enemy character is returned and replaced by the respawn time RT that changes according to the number of playing characters PC arranged in the battle space BF. And in step S6 of the respawn control program RCP, the battle ends when it is determined that the predetermined clearing conditions set by the game program are met.

What is claimed is:

1. A non-transitory computer-readable storage medium storing computer game program instructions executable by a processor to perform operations, the operations comprising:

placing a predetermined number of nonplayer characters in a battle space set in a three-dimensional virtual space;

in response to an instruction from at least one player, controlling a playing character corresponding to the player to be placed and to be withdrawn in and from the battle space at any time;

performing a procedure for controlling a battle between the nonplayer characters and the playing character disposed in the battle space;

rendering a battle state between the nonplayer characters and the playing character in the battle space with a virtual camera arranged in the battle space, and displaying on a display of each player;

the operations further comprising:

counting a number of playing characters placed in the battle space;

excluding a defeated nonplayer character from the battle when the defeated nonplayer character is defeated by the playing character in the battle space;

relocating the defeated nonplayer character to the battle space after a predetermined respawn time has elapsed; and calculating the respawn time according to the counted number of playing characters that are placed in the battle space;

wherein the relocating includes controlling a time to reposition the defeated nonplayer character to the battle space based on the respawn time calculated.

2. The non-transitory computer-readable storage medium of claim 1, wherein the calculating the respawn time further includes that, the more the number of playing characters placed in the battle space, the shorter the respawn time is calculated.

3. The non-transitory computer-readable storage medium of claim 2, wherein a minimum value is set for the respawn time and when the number of playing characters placed in the battle space is more than a predetermined number, the respawn time is set to the minimum value.

4. The non-transitory computer-readable storage medium of claim 2, wherein the respawn time has a default respawn time set, and when there is only one playing character placed in the battle space, the default respawn time is set as the respawn time.

5. A game system comprising a processor and a memory storing computer game program instructions executable by the processor to perform operations, the operations comprising:

placing a predetermined number of nonplayer characters in a battle space set in a three-dimensional virtual space;

in response to an instruction from at least one player, controlling a playing character corresponding to the player to be placed and to be withdrawn in and from the battle space at any time;

performing a procedure for controlling a battle between the nonplayer characters and the playing character disposed in the battle space;

rendering a battle state between the nonplayer characters and the playing character in the battle space with a virtual camera arranged in the battle space, and displaying on a display of each player;

the operations further comprising:

counting a number of playing characters placed in the battle space;

excluding a defeated nonplayer character from the battle when the defeated nonplayer character is defeated by the playing character in the battle space;

relocating the defeated nonplayer character to the battle space after a predetermined respawn time has elapsed; and calculating the respawn time according to the counted number of playing characters that are placed in the battle space;

wherein the relocating includes controlling a time to reposition the defeated nonplayer character to the battle space based on the respawn time calculated.

6. The non-transitory computer-readable storage medium of claim 1, wherein the counting the number of playing characters includes counting the number of playing characters disposed in the battle space when the defeated nonplayer character is defeated by the playing character.

7. The non-transitory computer-readable storage medium of claim 1, wherein a default respawn time is set for the respawn time, and the calculating the respawn time calculates the respawn time from the default respawn time in a manner that reduces the default respawn time according to the number of playing characters disposed in the battle space counted by the counting the number of playing characters.

8. The non-transitory computer-readable storage medium of claim 1, wherein a plurality of the battle space is set in the three-dimensional virtual space.

9. The non-transitory computer-readable storage medium of claim 8, wherein a default respawn time is set for the respawn time, and the default respawn time is set in a manner that fluctuates for each of the plurality of battle spaces.

10. The non-transitory computer-readable storage medium of claim 9, wherein the default respawn time is set in a manner that fluctuates for each battle space according to the strength of the nonplayer characters and the playing character disposed in the battle space.

11. The non-transitory computer-readable storage medium of claim 1, wherein the respawn time is calculated based on an equation, with the equation including a default respawn time.

12. The non-transitory computer-readable storage medium of claim 11, wherein the equation decreases the default respawn time by a predetermined amount for each additional playing character in the battle space.

13. The non-transitory computer-readable storage medium of claim 12, wherein the equation includes the respawn time being equal to the default respawn time minus a product of the predetermined amount and a difference, the difference being based on the number of playing characters placed in the battle space.

14. The non-transitory computer-readable storage medium of claim 13, wherein the difference is the number of playing characters placed in the battle space minus one.

15. The non-transitory computer-readable storage medium of claim 14, wherein the default respawn time is sixty seconds and the predetermined amount is ten seconds.

* * * * *